United States Patent [19]

Lewis

[11] 4,162,735

[45] Jul. 31, 1979

[54] SELF-LOADING/UNLOADING APPARATUS FOR CARGO CARRYING TRUCK OR TRAILER

[76] Inventor: Milburn Lewis, 18418 94th Ave. NE., Bothell, Wash. 98011

[21] Appl. No.: 819,122

[22] Filed: Jul. 26, 1977

[51] Int. Cl.² .............................................. B60P 1/00
[52] U.S. Cl. .................................... 414/514; 414/521
[58] Field of Search .................... 214/82, 83.22, 83.34, 214/83.36, 516, 510, 514, 519–522; 198/811, 836, 837

[56] References Cited

U.S. PATENT DOCUMENTS

| | | | |
|---|---|---|---|
| 2,979,177 | 4/1961 | Sullivan | 193/35 A |
| 3,498,482 | 3/1970 | Lewis | 198/811 X |
| 3,612,316 | 10/1971 | Baldwin et al. | 214/516 |

FOREIGN PATENT DOCUMENTS 196604  5/1967  U.S.S.R. .................................. 198/856

Primary Examiner—Albert J. Makay
Attorney, Agent, or Firm—Christensen, O'Connor, Johnson & Kindness

[57] ABSTRACT

A truck or trailer body is equipped with a self-loading/unloading apparatus including a power-driven, flexible belt and a movable bulkhead. The belt covers the floor of the body from front to rear and is drivable fore and aft so as to provide a movable cargo supporting bed while the bulkhead is also movable fore and aft by means of a lost motion coupling between the belt and bulkhead that includes a belt-carried drive bar which depending on the direction of belt travel alternately moves into contact with spaced apart catch surfaces provided on a support frame for the bulkhead. A parallel motion mechanism is carried on the bulkhead support frame for maintaining the bulkhead parallel to the drive bar and thus in alignment with the belt and bed so that the bulkhead does not tend to cock and thereby bind along the sidewalls. Additionally, pneumatically actuated clamps are provided along the lateral margins of the belt for clamping the belt to the body when the belt is stationary and is not being used for loading or unloading, so as to form seals between the upper marginal surfaces of the belt and the sidewalls to keep the edges and under surfaces of the belt free of abrasive particles, and so as to prevent fraying of the belt edges due to flapping of the belt which may otherwise occur under certain conditions.

7 Claims, 7 Drawing Figures

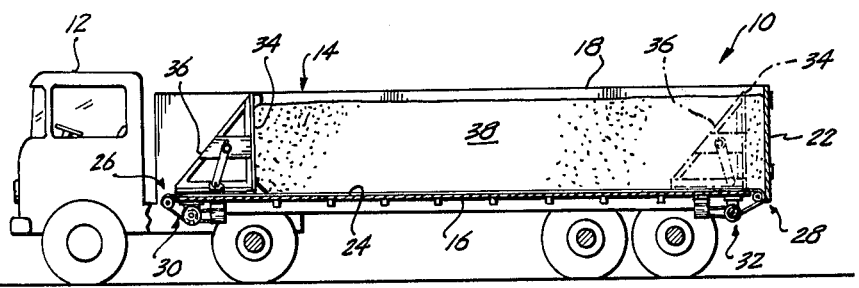
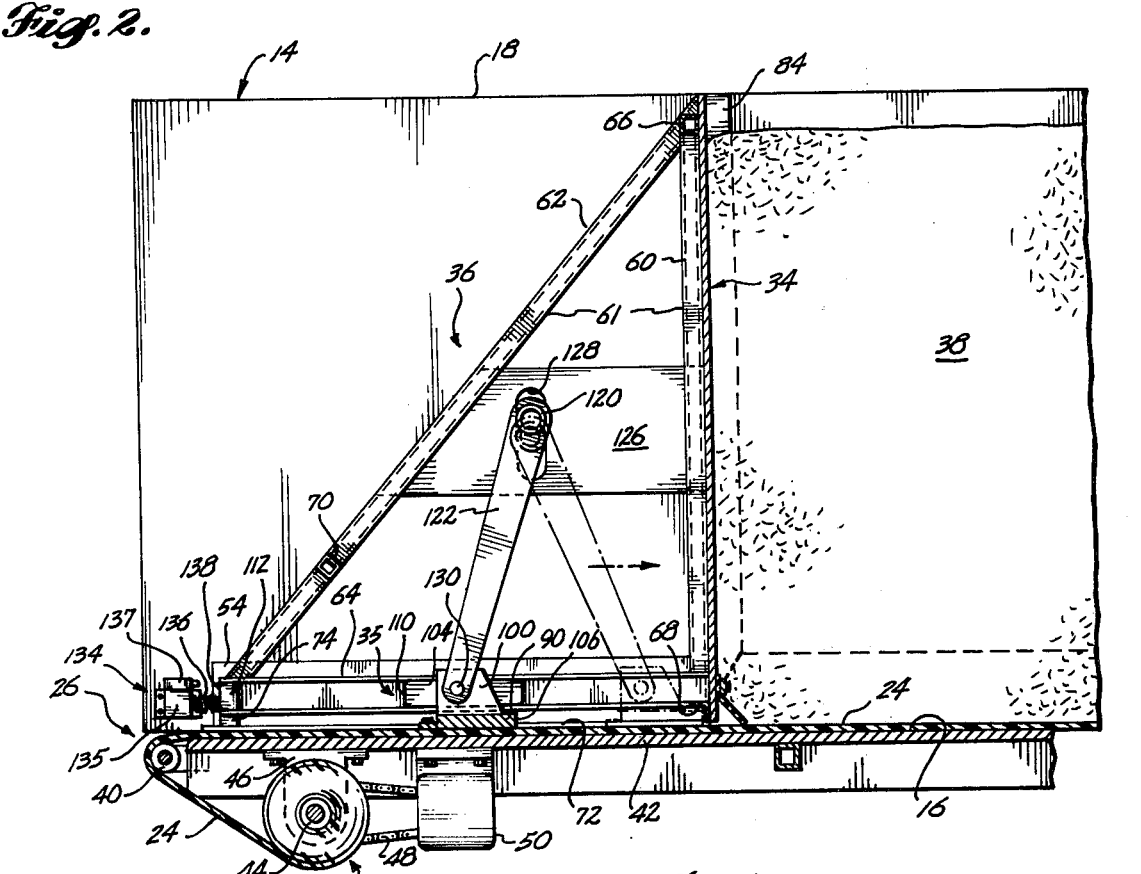
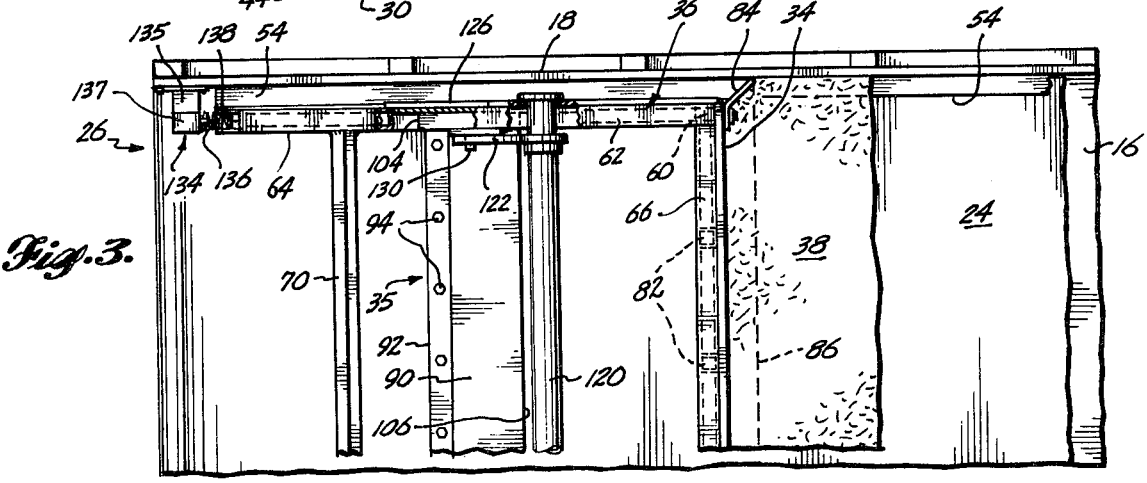

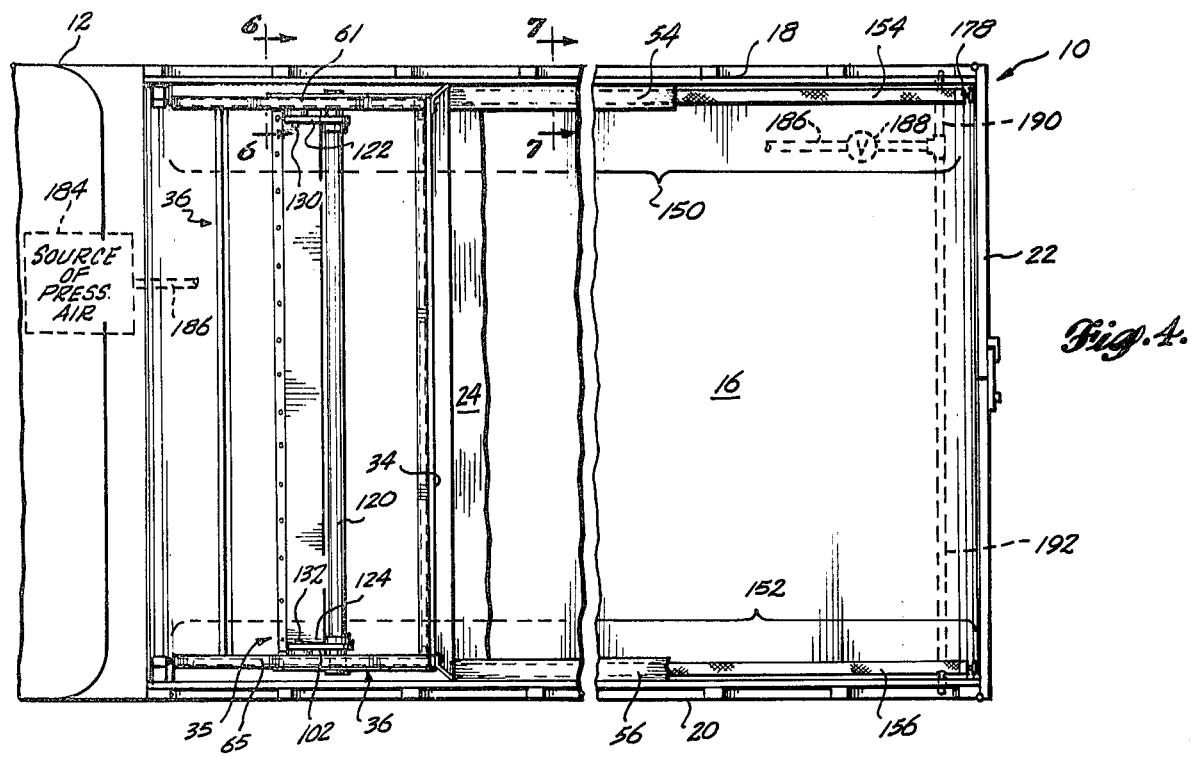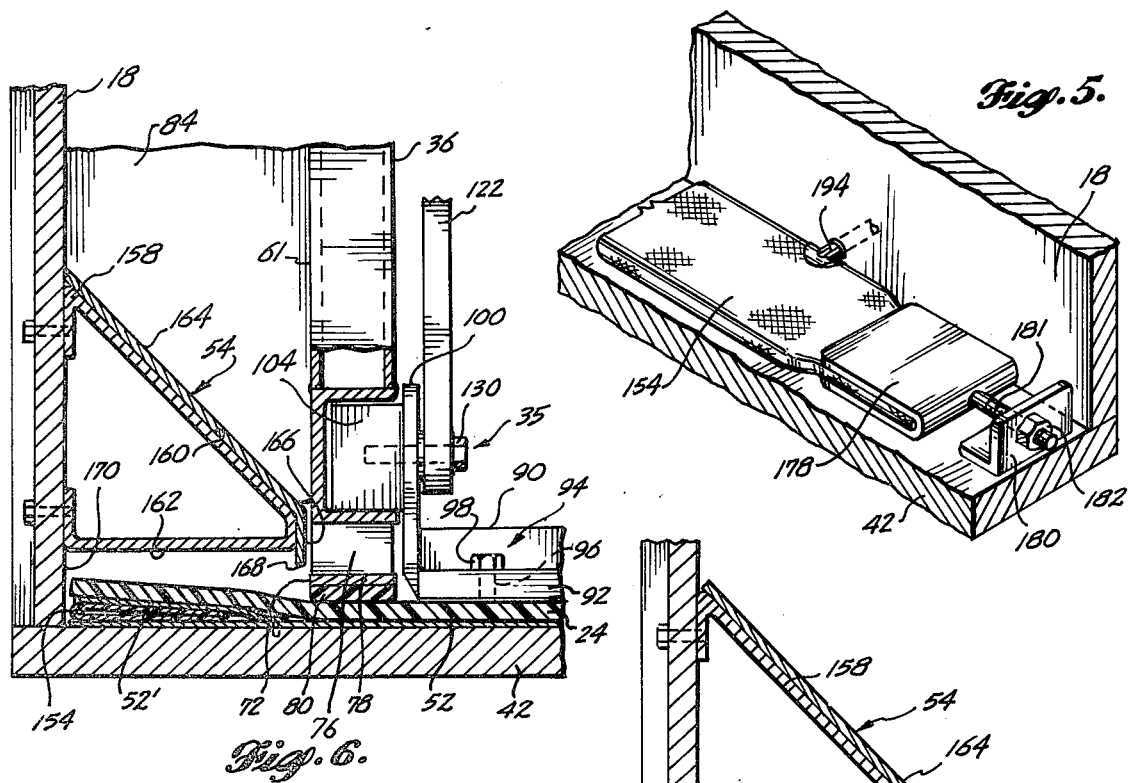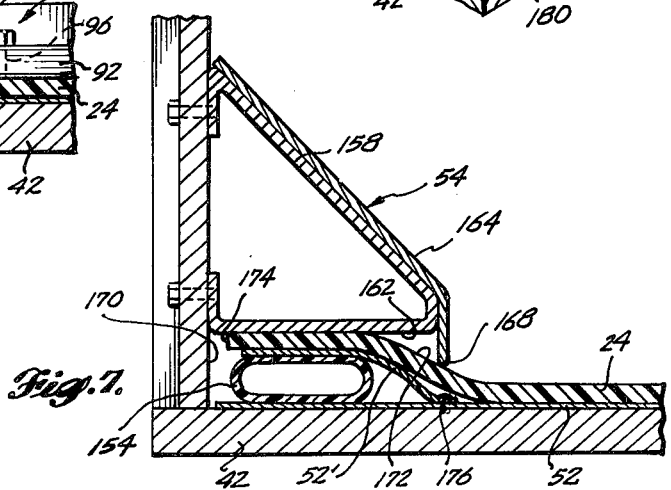

SELF-LOADING/UNLOADING APPARATUS FOR CARGO CARRYING TRUCK OR TRAILER

BACKGROUND

Vehicles equipped with self-loading/unloading apparatus of the type including a movable flexible belt and an associated movable bulkhead are in general known as disclosed in my prior U.S. Pat. No. 3,498,482, issued Mar. 3, 1970.

Such apparatus have proved successful in reducing the time and labor needed to unload cargo from truck and trailer bodies, especially particulate and compactible cargo as sawdust, wood chips, humus, sand, gravel and garbage. As described in the above-mentioned U.S. patent, to unload these types of cargo it is advantageous, if not essential, to provide a lost motion coupling between the bulkhead and belt so that during unloading, the belt is moved aft (toward the discharge end of the body) approximately one to four feet before the bulkhead begins its aft travel, in order to decompact the cargo. Such decompaction relieves some of the frictional forces existing between the cargo and the sidewalls which, in turn, lessens the force required by the bulkhead to push the cargo toward the discharge end of the bed.

An optimum distance of travel of the belt relative to the bulkhead during the lost motion action, can be determined for each application. The distance will vary as a function of such factors as the type of cargo, the length of the bed and the height of the sidewalls. For some applications, a relatively large amount of belt travel is required such as in the embodiment of the invention disclosed in my prior U.S. patent. In such case, a lost motion mechanism employing a roller as disclosed therein has proven to be of advantage because the excess length of belt needed to accommodate the relatively long belt-to-bulkhead travel is wound into a compact coil on a roller assembly journaled on a support frame for the bulkhead.

In other applications, a lesser amount of belt-to-bulkhead lost motion travel is required and it is thus desirable to use a less complex, lower cost lost motion coupling. Also there are some applications that require a belt drive system which is incompatible with the use of a lost motion roller carried by the support frame of the bulkhead. For these reasons the use of a non-rotating, or translational lost motion coupling between the belt and bulkhead has been proposed. In such a coupling the support frame for the bulkhead is provided with forward and rear catch surfaces that are spaced apart in the direction of belt travel by the distance of belt-to-bulkhead travel that is required. During unloading, drive means attached to the belt moves in a horizontal plane from the forward catch surfaces to the rear catch surfaces on the bulkhead support frame allowing the belt to advance toward the aft or discharge end of the bed before the bulkhead commences to move aft. When the drive means contacts the rear catch surfaces on the bulkhead frame, the bulkhead is entrained along with the belt to complete the unloading operation. Thereafter, the belt and bulkhead are returned to their initial positions.

While the principle of this translational lost motion coupling is straight forward, its implementation has proved troublesome. One particular difficulty has been a tendency of the bulkhead to become cocked (rotated about a vertical axis) relative to the sidewalls, during the lost motion travel of the belt with respect to the bulkhead, whereupon the bulkhead binds against the sidewalls or side-rail guides. This usually occurs during the lost motion action when the drive means on the belt is out of contact with the catch surfaces on the support frame and there is no positive engagement therebetween to cause the bulkhead to align itself with the drive means.

The most straight-forward solutions to this problem of the binding of the bulkhead have not proved effective. For example, one might suspect that it would be easy to maintain alignment between the bulkhead and the belt by providing close tolerance tracks and sliders for guiding the bulkhead with respect to the body and thereby maintaining the bulkhead in constant alignment with the bed and thus with the sidewalls. However, close tolerance guiding of the bulkhead in this environment produces an undesirable frictional drag on the bulkhead that can severely overload the bulkhead drive force which is limited by the strength characteristics of the belt. Also, the environment of the apparatus is such that any closely fitting track and slider components tend to accumulate grit which increases both the frictional effects and the tendency of the bulkhead to bind up. Therefore, it has been found desirable to maintain a loose fit between the the bulkhead and the sidewalls of the body so as to minimize the frictional forces and provide greater immunity of the apparatus to the presence of sand, grit, dirt and other particulate matter. However, the loose fit of the bulkhead with respect to the sidewalls merely aggravates the tendency of the bulkhead to cock and thus bind.

Another operational problem attributed to the presence of sand, grit, dirt and other particulate matter, is a tendency of the lateral edges of the belt to become frayed due to the abrasive effects of accumulated grit and the like in belt-edge retaining recesses that are provided along the sidewalls of the body. This is especially true when hauling certain types of cargo, such as gravel or sand, which due to vibration occurring during transport, will tend to work into the recesses. Also, some of the sand or gravel will work under the belt and degrade or destroy an antifriction sheet over which the lower surface of the belt slides.

Accordingly, one object of the invention is to provide a lost motion mechanism of the translational type for coupling the belt and bulkhead in a self-unloading apparatus of the above-described character, which maintains alignment between the bulkhead and the belt during the lost motion travel of the belt with respect to the bulkhead. More specifically, it is desired to eliminate the tendency of the bulkhead to bind against the sidewalls or sidewall guides of the truck or trailer body due to cocking of the bulkhead and its support frame during the lost motion movement of the belt relative to the stationary bulkhead at the initiation of each unloading operation.

A further object of the invention is to provide an improved self-unloading apparatus of the character described which is less susceptible to malfunction and rapid wear due to grit, sand, gravel or other particulate matter that constitutes or accompanies the cargo carried by such trucks or trailers.

Another object of the present invention is to provide an improved self-unloading apparatus of the above-described character which prevents the edges of the belt from rapidly becoming frayed due to the abrasive effects of accumulated grit and other particulate matter adjacent the edges of the belt. A related object is to prevent grit and other particulate matter from accumulating beneath the belt and abrading the smooth, low friction surface over which the lower surface of the belt slides.

SUMMARY OF THE INVENTION

In a self-loading/unloading apparatus of the character described above, a parallel motion means is provided on a support frame for the bulkhead for coacting with a belt-to-bulkhead lost-motion coupling of the translational type so as to maintain the bulkhead in proper alignment with the bed of the truck or trailer. A frame supportively mounts the bulkhead between the sidewalls of the body and maintains the bulkhead in a generally upright orientation for pushing the cargo aft as the belt and bulkhead move toward an aft end of the bed where the cargo is discharged. An elongate drive bar is affixed to the top of the belt so as to extend transversely between the sidewalls. Cooperating with this elongate drive bar are spaced apart catch surfaces provided at the forward and rearward extents of the bulkhead support frame.

As the belt is driven toward the rear end of the bed, the drive bar contacts a rearward catch surface on the support frame and entrains the bulkhead with the belt for the balance of the rearward travel. The reverse or forward movement of the belt causes the drive bar to move into contact with forward catch surface on the bulkhead frame so that when the belt is returned to its initial position in preparation for receiving another load of cargo, the bulkhead is similarly returned to its initial position adjacent the forward end of the bed. The forward and rear catch surfaces are spaced apart in the fore/aft direction such that the drive bar must travel a distance corresponding to the desired amount of belt travel during the lost motion action, in order to move from a position in contact with the forward catch surfaces to a position in contact with the rear catch surface.

The parallel motion mechanism is connected between the drive bar and the bulkhead support frame so as to force the bulkhead to always remain parallel to the drive bar and thus in alignment with the bed and sidewalls of the body. For this purpose the mechanism preferably comprises an elongate torque transmitting member mounted on the bulkhead support frame parallel to and elevated above the drive bar. The torque transmitting member is journaled for rotation with respect to the support frame and it has non-rotatably connected, transversely extending torque producing arms that depend downwardly from opposite ends of the member and are connected at their lower ends to opposite ends of the drive bar. The torque transmitting member and its attached arms form a rigid yoke that counteracts any uneven displacement of the ends of the drive bar with respect to the bulkhead support frame and thus resists any tendency of the bulkhead to cock.

Additionally, the self-loading, unloading apparatus is equipped with belt-edge clamping devices which are controlled in conjunction with the belt power drive system. In the preferred form of the clamping devices, the lateral margins of the belt are slidably retained within recesses extending longitudinally along the lower extent of the sidewalls of the body, adjacent the bed, and inflatable hoses are positioned within such recesses and are so arranged, that when inflated, a surface of each margin of the belt is pressed against an adjacent surface of the recess. The hoses are inflated to clamp the belt when it is stationary with respect to the bed, such as during travel of the vehicle whether loaded or unloaded, and are deflated to release the clamp when the belt is to be driven relative to the bed during loading or unloading. Preferably, the hoses are arranged within the recesses such that when inflated, seals are formed along the belt margins which prevent particulate matter, when subjected to the normal vibrational effects of transport vehicles, from creeping into the recesses and accumulating adjacent the edge of the belt where such particulate may jam the belt movement, abrade the edges of the belt, and roughen the otherwise smooth antifriction surface upon which the belt rides.

Another advantage of the clamping devices is to secure the lateral margins of the belt when the belt is not loaded down by cargo and the truck or trailer is travelling at highway speeds. Under these conditions, airflow-caused pressure differentials develop between the upper and lower surfaces of the belt which may cause flapping of the belt along its lateral margins, if not secured. Rapid fraying of the belt edges will result, necessitating costly replacement of the entire belt. By clamping the lateral margins of the belt to the body, the problem of belt flapping is eliminated.

These and further objects, features and advantages of the invention will become apparent from the following detailed description of the preferred form of the invention.

BRIEF DESCRIPTION OF THE DRAWINGS

FIG. 1 is a side view of a semi-trailer incorporating the self-loading/unloading apparatus of the invention in which the cargo carrying body of the semitrailer is shown in cross section;

FIG. 2 is an enlarged fragmentary view of a forward portion of the semitrailer body of FIG. 1 illustrating the flexible belt and bulkhead which are mounted for fore-/aft movement along the bed of the body;

FIG. 3 is a plan view of the body, belt and bulkhead as shown in FIG. 1.

FIG. 4 is another plan view, similar to FIG. 3 but illustrating both the forward and aft ends of the semitrailer body;

FIG. 5 is a detail view of a portion of a pneumatic clamping device employed in the apparatus illustrated in the above figures;

FIG. 6 is a fragmentary, cross-sectional view taken along a vertically and transversely extending plane as indicated by line 6—6 in FIG. 4;

FIG. 7 is also a fragmentary cross-sectional view taken along a vertically and transversely extending plane as shown by line 7—7 of FIG. 4.

DETAILED DESCRIPTION OF THE PREFERRED EMBODIMENT

With reference to FIG. 1, the improvements in the self-loading/unloading apparatus provided by the invention are disclosed by reference to equipment mounted on a semi-trailer 10 pulled by a tractor 12, in whcih semi-trailer 10 includes a cargo carrying body 14 having a bed 16 and sidewalls 18 and 20 (see FIG. 4). It will be appreciated however that the invention may be used on a wide variety of cargo carrying vehicles, including trucks and full trailers having a body of the above-described character. The top of the body may be covered, or it may be open as in the case of body 14. Usually, it will be desirable to close one end of the body with an openable rear wall, such as illustrated by double door tailgate 22.

To assist in the loading and/or unloading of cargo from body 14, it is equipped with a power-driven, flexible belt 24 that slidingly and supportively rests on bed 16 and extends between forward and aft ends 26 and 28, respectively, and between sidewalls 18 and 20, respectively, thus covering the entire bed area. Belt 24 is movable fore and aft by a belt drive system, including in this embodiment fore and aft power-driven belt-spooling assemblies 30 and 32. Assemblies 30 and 32 also serve to indirectly drive a fore and aft movable bulkhead 34 by means of a lost motion coupling 35 between belt 24 and a support frame 36 for bulkhead 34. Although the thusly equipped semi-trailer 10 may be used for both loading and unloading, it is primarily intended for unloading cargo of the particulate or compactible ltype heretofore mentioned. In such case, cargo 38 will be loaded into body 14 through the open top, and will be self-unloaded by driving belt 24 and bulkhead 34 rearwardly toward aft end 28, discharging cargo 38 through the opened tailgate 22. The moving belt 24 carries the weight of the load while bulkhead 34 moving aft in unison with belt 24 plows or pushes the load rearwardly, overcoming frictional forces between the load and sidewalls 18 and 20 that otherwise would cause a large part, if not the major part, of cargo 38 to be left in body 14 after the completion of the rearward travel of belt 24.

With reference to FIG. 2, belt 24 is of a flexible, fabric reinforced rubber construction having strength characteristics suitable for both conveying the weight of the cargo 38 and for driving bulkhead 34 and its support frame 36. Power driven spooling assemblies 30 and 32 are essentially the same, and thus a description of assembly 30 will also suffice for both. Belt 24 wraps around an idler roller 40 mounted along the forward end 26 of bed 16 and returns beneath a floor panel 42 of body 14 where it is wound onto a belt spool 44. Spool 44 is journaled for rotation on inverted support pedestals 46 which in turn are mounted to a lower surface of floor panel 42, and is controllably driven in either direction of rotation by a hydraulically powered motor 50 via a chain and sprocket assembly indicated at 48. Motor 50 is also mounted to the lower surface of floor panel 42. As best shown in FIGS. 6 and 7, bed 16 is provided with an antifriction sheet 52 of relatively thin stainless steel, e.g., on the order of 15 to 24 thousandths of an inch to provide a smooth bed surface upon which the rubber belt 24 can be slid without developing excessive frictional forces, even when loaded by the weight of cargo 38.

Located along the lower inside surfaces of sidewalls 18 and 20 adjacent bed 16 are elongate side-rails 54 and 56 which laterally restrain and guide bulkhead 34 and frame 36, and which form belt-edge retaining recesses in conjunction with bed 16, as described more fully hereinafter.

With reference to FIGS. 2 and 3, support frame 36 is formed by a pair of triangularly shaped side sections, one of which is shown in FIG. 2 as section 61 formed by an upright member 60, a diagonal member 62 that slopes upwardly and rearwardly and a horizontal member 64. Members 60 and 62 are of tubular steel having rectangular cross sections, while member 64 is a steel channel placed on its side so that the opening faces inwardly and thus away from sidewall 18. Members 60, 62 and 64 are welded together at the vertices of the triangle. Side section 61 and a similarly formed side section 65 located adjacent sidewall 20 (see FIG. 4) are connected by a set of cross-bracing members 66, 68 and 70. Member 66 is of tubular steel construction with a rectangular cross section and is mounted along the upper edge of bulkhead 34 between the apexes of side sections 61 and 65. Member 68 is a steel angle that extends along the lower edge of bulkhead 34 between the right angle vertices of side sections 61 and 65. And member 70 is of tubular steel with a rectangular cross section and extends between diagonal member 62 of section 61 and the corresponding diagonal member of section 65 at an elevated position with respect to channel member 64 of section 61 and the corresponding channel member of side section 65.

The entire support frame 36 is mounted on fore/aft extending skids, one of which is shown as skid 72 in FIGS. 2 and 6. Skid 72 and its counterpart on the opposite side of frame 36 are respectively located beneath side sections 61 and 65, and are attached to the channel members by supporting feet as illustrated by skid 72 which underlies channel member 64 and is attached thereto by a forward foot 74 (FIG. 2) and rear foot 76 (FIG. 6). As shown by skid 72 in FIG. 6, each skid has a runner 78, the bottom of which is provided with an antifriction strip 80, of such material as polyethylene, to minimize the sliding friction between skid 72 and the upper surface of belt 24 during the relative lost motion between belt 24 and bulkhead 34.

Bulkhead 34, which may be provided with a panel of wood or other suitable material, is fastened to the portion of frame 36 formed by the upright members (e.g., member 60) of side sections 61 and 65 and cross-bracing members 66 and 68. An additional plurality of upright members 82 are provided at intervals intermediate side sections 61 and 65 for reinforcing the panel that forms bulkhead 34. Attached to bulkhead 34 are a pair of sidewall wipers 84 and a bed wiper 86, each of which is made of an elastomeric material.

With reference to FIGS. 2 and 3, lost motion coupling 35 includes a drive bar 90 disposed crosswise on the upper surface of belt 24 so that the opposite ends of bar 90 are adjacent the side sections 61 and 65 of bulkhead support frame 36. Bar 90 is affixed to belt 24 by means of a flange 92 along the forward edge of bar 90 and a plurality of bolt and nut fasteners 94. As best shown in FIG. 6, each of the fasteners 94 includes a flat head bolt 96, the shank of which is passed upwardly through aligned apertures in belt 24 and flange 92 and is secured by a nut 98 so that the flat head of bolt 96 is substantially flush with the lower surface of belt 24 that rides on bed 16.

The opposite ends of bar 90 are provided with upstanding ears, as shown by ear 100 in FIGS. 2 and 6, and a corresponding ear 102 shown in FIG. 4. Ears 100 and 102 are of a steel plate material and are welded to the ends of bar 90. As shown by ear 100, the plates forming the ears are dimensioned so as to project upwardly from bar 90 and extend across the opening of the adjacent channel member, in this instance, member 64. On the outboard sides of ears 100 and 102, sliders are welded, as illustrated by slider 104 in FIGS. 2 and 6, which are elongate in the fore/aft direction and have rectangular cross-sectional shapes complementing the openings of the channel members. Slider 104 and channel member 64 thus form cooperating slider and slider-guide means which together with their counterparts on the opposite side of frame 36 constrain drive bar 90 to a fixed horizontal plane of reciprocation relative to support frame 36. The above-described parts are sized and arranged so that when the skids 72 of support frame 36 are resting on the upper surface of belt 24, bar 90 and its associated flange 92 are elevated to raise that portion of belt 24 attached to flange 92 slightly up off bed 16 to prevent any interference between the heads of bolt 96 and the antifriction sheet 52 upon which belt 24 rides. Additionally, these parts are sized and arranged so that as bar 90 moves aft with belt 24, relative to frame 36 and bulkhead 34, a rear edge 106 of bar 90 slides into edgewise contact with vertically oriented depending leg of angle member 68 at the rearward end of frame 36 immediately behind bulkhead 34 (see dotted line position of bar 90 in FIG. 2). The horizontally oriented leg of member 68 is substantially coplanar with the lower flanges of the side section channel members (e.g., member 64) so that the upper surface of bar 90 adjacent rear edge 106 slides under the horizontal leg enabling the edge 106 of the bar to bear against the forwardly facing surface of the vertical leg of member 68. When bar 90 thus catches on angle member 68, further relative motion between belt 24 and bulkhead 34 ceases and bulkhead 34 and its support frame 36 are thereafter entrained by drive bar 90 toward the aft end 28 of the trailer body 14.

The lengths of slider 104 and its counterpart are selected so that the rear ends of the sliders have clearance with respect to the bulkhead 34 when drive bar 90 contacts angle member 68. Thus the load associated with moving the bulkhead 34 rearwardly is borne by drive bar 90 and member 68, not by the sliders. On the other hand, during the return of drive bar 90 and bulkhead 34 to the forward end 26 of body 14 the sliders' forward ends, such as end 110 of slider 104, move into abutment with stop blocks, such as block 112, fastened at the ends of the associated channel members to complete the return travel. The force involved in returning bulkhead 34 and support frame 36 to the initial or forward position in the truck bed, is small compared to that needed to drive the bulkhead aft during unloading, and thus the loading on sliders (e.g., slider 104) as they act on the stop blocks (e.g., block 112) at opposite sides of frame 36 is within acceptable limits for the return movement of the bulkhead.

Lost motion coupling 35 incorporates a parallel motion mechanmism, including a torque transmitting member 120 of tubular construction and a pair of associated, torque producing arms 122 and 124, that in combination form a rigid, rotatable yoke for maintaining bulkhead 34 parallel to drive bar 90 during the lost motion travel of bar 90 relative to support 36. Member 120 is disposed crosswise on support frame 36, elevated above bar 90, and has its opposite ends supportively mounted by, and journaled for rotation in a pair of vertically oriented end support plates, one of which is shown as plate 126 in FIGS. 2 and 3. These plates are attached to side sections 61 and 65 about midheight thereof and are each provided with a vertically elongated slot, as illustrated by slot 128, which supportively receive the ends of tubular member 120. The thusly supported member 120 is accordingly free to rotate about a horizontal axis that lies crosswise to support frame 36 and is free to translate in a vertical plane which includes the axis of rotation. Arms 122 and 124 are transversely and non-rotatably connected to member 120 adjacent opposite ends thereof and 124 depend downwardly from member 120 such that their lower ends terminate alongside the inboard faces of ears 100 and 102, respectively. Thereat, the lower ends of arms 122 and 124 are pivotally connected to ears 100 and 102, respectively, by pivot pins 130 and 132 oriented along aligned horizontal axes extending parallel to the axis of torque-transmitting member 120. Thus, as bar 90 reciprocates relative to support frame 36, guided in a fixed horizontal plane by the sliders and cooperating guide channels (e.g., slider 104 and channel member 64), the yoke structure formed by arms 122, 124 and member 120 is rotated about the axis of member 120. Member 120 also reciprocates in a vertical plane (accommodated by the vertically oriented slots, e.g., slot 128). Since any unequal fore/aft movement of the ends of bar 90 relative to frame 36 is resisted by arms 122, 124 and member 120, the latter of which is in turn constrained by the slots in the end support plates (e.g., slot 128 in plate 126), bulkhead 34 is maintained parallel to drive bar 90.

Adjacent forward end 26 of bed 16, a pair of spring bumper and limit switch assemblies are mounted on sidewalls 18 and 20, as illustrated by assembly 134 in FIGS. 2 and 3, for limiting forward motion of the bulkhead and belt at the end of their return travel. The assemblies are identical, and thus only assembly 134 will be described. It includes a support 135 which is attached to sidewall 18 adjacent the forward end of rail 54. As discussed more fully hereinafter support 135 mounts a coiled spring 136 and a limit switch 137 which are arranged with respect to forward end 138 of frame 36 to initially arrest the forward movement of frame 36 and thereafter turn off power to the belt drive assemblies 30 and 32 as belt 24 reaches a position in which the sliders (e.g., slider 104) are driven against the stop blocks (e.g., block 112) and the springs are compressed sufficiently to cause the limit switches to be actuated. Similar bumper and switch assemblies (not shown) are also mounted adjacent the rear end 28 of bed 16 to limit the aft travel of belt 24 and bulkhead 34.

For ease in servicing the mechanism, drive bar 90 and the associated ears and sliders may be removed from frame 36 by withdrawing pivot pins 130 and 132 to disconnect arms 120 and 124 from ears 100 and 102, and by removing stop block 112 and its counterpart on the opposite side of frame 36. Thereupon belt 24 and drive bar 90 are slid forwardly, relatively to frame 36, to cause slider 104 and its counterpart, to slide out of the now open forward ends of the associated channel members, decoupling bar 90 from support frame 36, and enabling frame 36 and bulkhead 34 to be removed from the trailer body for repair.

With reference to FIG. 4, trailer body 14 is also equipped with controllable, belt-edge clamping devices 150 and 152 disposed along bed 16 adjacent sidewalls 18 and 20 for clamping the opposed lateral margins of belt 24 to body 14 when belt 24 is not being used for loading or unloading and is thus stationary with respect to the bed. More particularly, clamping devices 150 and 152 are designed so that when actuated, seals are formed between the upper marginal surfaces of belt 24 and side-rails 54 and 56 to prevent particulate matter contained in cargo 38 from creeping around and under the edges of belt 24. Also, devices 150 and 152 are actuated during road travel of semi-trailer 10, when empty, to prevent flapping of the edges of belt 24 caused by airflow-induced pressure differentials between the upper and lower surfaces of the belt while travelling at highway speeds.

In the illustrated embodiment, clamping devices 150 and 152, include inflatable air hoses 154 and 156 which are arranged to operate in conjunction with the associated side-rails 54 and 56, respectively. The construction and functioning of the clamping devices 150 and 152 are identical, and therefore only device 150, including air hose 154 and side-rail 54 will be described in detail. Thus, with reference to FIG. 6, side-rail 54 is formed of an elongate structure 158 of roughly triangular cross section which is fastened to sidewall 18 and is oriented to present an inclined surface 160 that slopes downwardly and inwardly from sidewall 18, and a horizontal surface 162 that is proximate to, but spaced above bed 16. To surface 160, a wear-plate 164 is attached to provide a wear surface parallel to surface 160 along which a lower, correspondingly inclined edge of sidewall wiper 84 rides. A lower longitudinal margin of wear-plate 164 is bent so as to depend downwardly in a vertical plane to form a lateral restraint and guide surface 166, which extends the full length of body 14, for laterally restraining and guiding side section 61 of bulkhead frame 36. A similar restraint and guide surface is provided on side-rail 56 for cooperating with the opposite side section 65 of frame 36.

The bent portion of wear-plate 164 is dimensioned so as to protrude somewhat below horizontal surface 162 to form a downwardly projecting lip 168 along the innermost extent of rail 54. Horizontal surface 162 and lip 168 of rail 54 are spaced proximate to, but sufficiently spaced from bed 16 so as to form a belt-edge retaining recess defined by horizontal surface 162, a lower longitudinally extending surface portion 170 of sidewall 18, and a lateral surface portion of bed 16 that underlies rail 54. The thusly defined recess opens laterally inwardly with respect to sidewall 18 and bed 16.

Air hose 154 is arranged beneath the margin of belt 124, in a position underlying rail 54, so that when hose 154 is inflated as shown in FIG. 7, the upper marginal surface 172 of belt 24 is pressed against lip 168 and against the superjacent surface 162 of rail 54. Moreover, by forcing surface 172 against lip 168, a seal is formed therebetween which blocks particulate matter contained in cargo 38 from working into the recess and around the edge 174 of belt 24. A secondary seal is also formed between belt surface 172 and rail surface 162 that also blocks particulate matter, however it is preferable to create the primary seal at lip 168 to keep the entire recess free of particulate matter.

To enable the margin of belt 24 that lies within the recess to slide freely over air hose 154, antifriction sheet 52 is provided with an elongate leaf portion 52' which lies over hose 154 and has its inboard edge 176 (see FIG. 7) fastened to the principal antifriction sheet 52, approximately along a line of attachment underlying lip 168. Leaf portion 52' may also be formed of stainless steel.

With reference to FIG. 5, hose 154 is made of cloth reinforced vinyl and is held in place by U-shaped clamps, one of which is shown as clamp 17, which are crimped onto the ends of the hose to both mechanically anchor the hose and also form an airtight seal at the otherwise open ends of the hose. Clamp 178 is provided with a threaded shank 181 which is attached at one end to a midpoint of the web of the clamp and projects rearwardly therefrom for being secured to an apertured bracket 180 by a nut fastener 182. Like clamps and bracket assemblies are provided at each of the ends of hose 156. Inflating air from a source 184 of pressurized air carried by tractor 12 is fed through a main line 186, controlled by valve 188 to branch lines 190 and 192 which are coupled to hoses 154 and 156, respectively, by means of fittings such as illustrated by fitting 194 for hose 154 as shown in FIG. 5.

While not essential to the invention, valve 188 may be an automatically operated valve controlled in conjunction with the belt drive system, so that hoses 154 and 156 are charged by source 184 whenever the motors of the belt drive assemblies 30 and 32 (see FIG. 1) are turned off thereby clamping belt 24 as shown in FIG. 7 whenever it is not being drive by assemblies 30 and 32. Conversely, when the motors of assemblies 30 and 32 are actuated valve 188 disconnects source 184 from hoses 154 and 156, and vents lines 190 and 192 to deflate the hoses as illustrated in FIG. 6. The clamping devices 150 and 152 are thus returned to the unactuated condition, enabling belt 24 to be freely moved fore and aft by drive assemblies 30 and 32.

OPERATION

With reference to FIG. 1, assume that belt 24 has been returned to its initial, pre-unloading position with bulkhead 34 adjacent the forward end 26 of semitrailer bed 16. In this position, the forward ends of the sliders (e.g., end 110 of slider 104) will be forced against the stop blocks (e.g., block 112) of bulkhead support frame 36, and support frame 36 will have been pulled as far forwardly of bed 16 as permitted by the bumper and limit switch assemblies (e.g., assembly 134 shown in FIGS. 2 and 3). The doors of tailgate 22 are closed and since the belt drive assemblies have been turned off, clamping devices 150 and 152 are actuated and thus air hoses 154 and 156 (FIG. 4) are charged, and body 4 is ready to receive cargo 38.

During loading transport of cargo 38, clamping devices 150 and 152 remain actuated to prevent any of the particulate matter in cargo 38 from working under side-rails 54 and 56 and from there under belt 24 as a result of road vibration.

When the delivery point is reached, the doors of tailgate 22 are opened and the belt drive assemblies 30 and 32 are actuated and simultaneously therewith, valve 188 vents hoses 154 and 156 to deactuate clamping devices 150 and 152. Belt 24 commences to move aft, and the resistance of cargo 38 restrains bulkhead 34 and thus frame 36, permitting a lost motion to occur in the movement of belt 24 relative to bulkhead 34 at the beginning of the unloading cycle. It is observed that the relative lost motion between the belt and bulkhead occurs even though bulkhead 34 and its support frame 36 rest on belt 24. Without the resistance created by cargo 38 bulkhead 34 and frame 36 would be carried aft with the belt. The relative motion between belt 24 and frame 36 is facilitated by the sliding action of the skids (e.g., skid 72 in FIG. 6) on the upper surface of belt 24. During this lost motion phase, drive bar 90 traverses the distance between the forward and rear extents of frame 36. Concurrently, torque transmitting member 120 and arms 122 and 124 of coupling 35 maintain bulkhead 34 parallel to drive bar 90, counteracting any tendency of the bulkhead to cock which if allowed to occur would cause the bulkhead and support frame to bind against side rails 54 and 56.

When drive bar 90 reaches the position shown by the dotted lines in FIG. 2, the lost motion ceases, and bulkhead 34 and frame 36 are entraind rearwardly by virtue of the positive driving relationship between the forward edge 106 of bar 90 and angle member 68 of frame 36. At the time that drive bar 90 contacts angle member 68, belt 24 has advanced rearwardly several feet carrying some of the particulate matter of cargo 38 toward the rear or discharge end 28 of bed 16, and thereby relieving some of the static friction that develops between cargo 38 and sidewalls 18 and 20. The diminished frictional forces along the sidewalls now enables bulkhead 38 to be driven rearwardly by belt 24 and drive bar 90 without causing intolerably large stresses to develop in the belt fabric and in the belt drive assemblies. When bulkhead 34 and support frame 36 reach the position shown by the dotted lines in FIG. 1, the cargo unloading operation is complete, and further rearward movement of the belt and bulkhead is terminated by bumper and limit switch assemblies (not shown) but similar to assembly 134 illustrated in FIGS. 2 and 3).

The direction of operation of assemblies 30 and 32 is now reversed and belt 24 and drive bar 90 are driven back toward the forward end 26 of the truck bed 16. The weight of frame 36 and bulkhead 34 resting on belt 24 will normally result in the frame 36 and bulkhead 34 being carried back to the forward end 26 of bed 16 with bar 90 remaining in the dotted line position shown in FIG. 2, up against angle member 68 at the rear end of support frame 36. This relationship continues until forward movement of frame 36 is arrested the bumper by springs (e.g., spring 136 in FIGS. 2 and 3) whereafter belt 24 and bar 90 continue to advance in the forward direction until the forward ends of the sliders (e.g., slider 104) abut against the forward stop blocks on frame 36. As the sliders engage the stop blocks, frame 36 is driven further forward, compressing the springs until the above-mentioned limit switches (e.g., switch 137) are operated to deenergize the belt drive motors. At this time, the edge clamping devices 150 and 152 are again actuated, to inflate air hoses 154 and 156 through valve 188, and the self-unloading apparatus is restored to its initial condition ready to receive another load of cargo.

Preferably, the belt clamping devices 150 and 152 are actuated and held in the actuated condition any time semi-trailer 10 and tractor 12 are driven, even when the trailer body is empty. As mentioned, such clamping of the belt margins prevents flapping of the belt and consequent fraying of the belt edges.

While only a particular embodiment of the invention has been disclosed, it will be readily apparent to persons skilled in the art that numerous changes, modifications and substitution of equivalent means and devices, can be made to such embodiment without departing from the spirit of the invention. For example, while the described embodiment provides a forward belt spooling assembly 30, an alternative is to use a cable and power winch assembly for pulling the belt in the forward direction to return the drive bar and bulkhead to the forward end of the trailer bed. In such case, the length of the belt need only extend to the drive bar, with the winch cables being connected directly to the drive bar.

Also, it may be desirable in some embodiments to provide guides along the upper edges of the sidewalls of the trailer body which cooperate with the top of the bulkhead to prevent the bulkhead from tipping, forwardly or rearwardly, due to unevenly distributed forces on the bulkhead during unloading.

The embodiments of the invention in which an exclusive property or privilege is claimed are defined as follows:

1. In a self-unloading apparatus for a cargo-carrying truck or trailer body having sidewalls and a bed therebetween that extends from a forward end to an aft end of the body, wherein said apparatus is the type including a flexible belt covering said bed and means for driving said belt fore and aft, and further including a load pushing bulkhead disposed between said sidewalls and mounted for relative fore and aft movement with respect to said bed, the combination therewith comprising:

a support frame for said bulkhead, said support frame supportively mounting said bulkhead on said body for fore and aft movement relative thereto;

an elongate drive bar affixed to said belt so as to extend crosswise of said bed;

forward and rear drive bar catch means provided on said bulkhead support frame and arranged with respect to said drive bar means such that aft movement of said belt relative to said bulkhead during an unloading operation causes said drive bar means to move into contact with said aft shoulder means and entrain said bulkhead along with said belt as said belt is driven aft during unloading of cargo from the body, and such that forward movement of said belt relative to said bulkhead causes said drive bar means to move into contact with said forward catch means on said bulkhead frame to entrain said bulkhead along with said belt as said belt is driven forward to return said belt and bulkhead to their initial positions adjacent the forward end of said bed, said forward and rear catch means being spaced apart in the fore/aft direction so as to cause a lost motion of said bulkhead relative to said belt at the beginning of each unloading operation, and, parallel motion means connected between said drive bar means and said bulkhead support frame for maintaining said bulkhead parallel to said drive bar means during the lost motion of said bulkhead relative to said belt.

2. The combination of claim 1 wherein said bulkhead frame is disposed on the forward face of said bulkhead and includes first and second laterally spaced apart sides, each being disposed adjacent one of said sidewalls of said body, and said parallel motion means comprising an elongate torque transmitting member mounted crosswise on said bulkhead frame and elevated above said drive bar, the opposite ends of said torque transmitting member being mounted for roation with respect to said first and second sides of said frame, and first and second torque producing arms transversely and non-rotatably connected to said torque transmitting member adjacent the opposite ends thereof and depending downwardly therefrom and being pivotally connected at their lower ends to opposite ends of said drive bar means such that said arms and torque transmitting member react to uneven displacement of said opposite ends of said drive bar means with respect to said first and second sides of said bulkhead to develop counteracting forces in said arms and torque member that force said bulkhead into parallelism with said drive bar means.

3. The combination set forth in claim 2 wherein said parallel motion means further comprises first and second elongate, horizontally disposed slider guide means positioned on said first and second sides of said bulkhead frame, respectively, adjacent to said belt, first and second slider guide means, respectively, and means for connecting the opposite ends of said drive bar means to said first and second slider means so as to guide said drive bar means in a fixed horizontal guide plane with respect to said bulkhead frame.

4. The combination set forth in claim 3 wherein said parallel motion means further comprises first and second support means attached to said bulkhead frame for supporting the opposite ends of said torque transmitting member, said first and second support means allowing said torque transmitting member to rotate about its axis and to reciprocate in a generally vertical plane to accommodate the fore/aft reciprocation of said drive bar means in a fixed horizontal plane relative to said first and second support means.

5. In a self-unloading apparatus for a cargo carrying body of a vehicle in which such body includes a bed having forward and rear ends and sidewalls, and is equipped with a flexible belt covering said bed from its front end to its rear end and from sidewall to sidewall, and means mounted on said body for moving said belt fore and aft relative to said bed, and a bulkhead disposed between said sidewalls and being movable fore and aft with said belt to assist in the loading and unloading of cargo carried in said body, the combination therewith comprising:

elongate controllable clamping means disposed on said body along the lower edges of said sidewalls adjacent to said bed, said controllable clamping means having an actuated condition in which said clamping means clamps the lateral margins of said belt to said body for securing said belt to said bed when said belt is stationary, and having a released condition in which said clamping means unclamps said lateral margins of said belt for allowing free, fore/aft movement of said belt with respect to said bed during loading and unloading of said cargo-carrying body; and further comprising an elongate recess oriented along the lower extent of each of said sidewalls adjacent said bed, said recesses opening inwardly toward the center of said bed for receiving and retaining the lateral margins of said belt and each recess having an interior wall surface superjacent to an upper marginal surface of said belt, and wherein said controllable clamping means includes elongate means disposed between said belt and said bed underlying each of said lateral margins, said elongate means being operative when said clamping means is in its actuated condition to press said upper marginal surfaces of said belt against said superjacent interior wall surfaces of said recesses so as to both clamp the lateral margins of said belt to said body and to form a seal between said upper marginal surfaces of said belt and the superjacent interior wall surfaces of said recesses.

6. The combination set forth in claim 5, wherein said means of said controllable clamping means for pressing said upper marginal surfaces of said belt against said superjacent interior wall surfaces of said recesses comprises at least one inflatable hose disposed lengthwise of said bed in underlying registry with a lateral margin of said belt, and means for inflating said hose when said controllable damping means is in its actuated condition and for deflating said hose when said clamping means is inactuated.

7. The combination as set forth in claim 5, wherein said controllable clamping means comprises an inflatable hose juxtaposed each of said lateral margins of said belt, means for inflating said hose when said controllable clamping means is in said actuated condition and for deflating said hose when said controllable clamping means is in its unactuated condition, and means mounting each of said inflatable hoses on said body for causing said hoses when inflated to clamp said belt margins to said body.

* * * * *